Patented Sept. 17, 1940

2,215,196

UNITED STATES PATENT OFFICE 2,215,196

PROCESS OF PRODUCING COLOR ON TEXTILE MATERIALS

Paul Schlack, Berlin-Treptow, Germany, assignor to General Aniline & Film Corporation, a corporation of Delaware No Drawing. Application September 14, 1937, Serial No. 163,742. In Germany September 23, 1936

14 Claims. (Cl. 8—29)

My present invention relates to a process of dyeing and more particularly to a process of dyeing fibers or films, ribbons etc., which contain polymeric components with salt-forming groups, viz. basic or acid groups, by producing thereon precipitates of white or colored metal compounds.

It is an object of this invention to provide a process by which artificial filaments or foils which have little or no swelling capacity in water and which are generally soluble in organic solvents may be dyed in fast tints and with surprising brilliancy of color.

A further object is to produce delustering of fibers of the kind referred to above by precipitating therein white metallic precipitates.

These and further objects will be apparent from the following specification.

Attempts have frequently been made to color fibrous materials, foils etc. produced from highly polymeric bodies which have little swelling capacity in water by producing upon them white or colored precipitates of inorganic materials or by causing inorganic metal compounds to react with organic substances which, without themselves having the character of dyestuff, yield with the metallic compound an opaque or colored precipitate, particularly one having the characteristic of a complex salt.

However, these attempts, at least in so far as they have dealt with individual colors, have not achieved results of any value since the precipitates, for example those produced by bichromate, lead sulfide or iron compounds of the nitrosonaphthols have proved insufficiently fast. Moreover, such colorings lack brilliance.

The present invention produces colorings which are in part thoroughly fast and in part of surprising brilliance by producing on or in threads, films, or the like, made from hydrophobic organophilic highly polymeric products which contain polar salt-forming relatively hydrophilic but also highly molecular polymeric components, white or colored precipitates of metals or metal compounds of a pure inorganic nature or precipitates of metal compounds and organic substances without particular dyestuff characteristics. Suitable organophilic film- or fiber-forming polymeric products are for instance cellulose esters, cellulose ethers, cellulose ether esters, polymeric vinyl esters, especially the ones made soluble in acetone by after-chlorination (see U. S. Patent No. 1,982,765 to Schönburg), polymeric vinyl-ketones and other polymerizates and mixtures thereof with cellulose derivatives.

Additions to the main substance of these substrata which are suitable for the process of this invention are, for example, resins of high molecular weight with a number of carboxyl groups, particularly polymerizates from unsaturated carboxylic acids or poly-carboxylic acids or mixed polymerizates of such carboxylic acids and compounds having active double linking, for instance the mixed polymerizates from organic or inorganic esters of vinyl alcohol, like vinyl chloride, vinyl formate, vinyl acetate, vinyl chloracetate or from vinyl alkyl ethers such as vinyl methyl ether, vinyl ethyl ether, vinyl butyl ether, from acrylic acid or methyl acrylic acid esters, nitriles or amides, styrene and acrylic acid, maleic acid, maleic ester acid, maleic anhydride, itaconic anhydride. Furthermore there belong here the mono-esters, soluble in organic solvents, of polyhydroxyl compounds with di- or poly-carboxylic acids, for example the esters are obtainable by the action of succinic acid anhydride, nonylene succinic acid anhydride, maleic anhydride or phthalic anhydride on organic cellulose derivatives still containing hydroxyl, for instance methyl cellulose, ethyl cellulose or acetyl cellulose or on synthetic polyhydroxyl compounds, for instance partially acetylated vinyl alcohol.

Compounds of this kind have already been described in U. S. patent application Ser. No. 57,524 filed January 4, 1936.

There also come into question for the process resins or derivatives of natural highly polymeric bodies with a number of basic groups in the molecule, for instance basic artificial resins of the polyvinyl series, like polyacrylic acid-omega-diethylaminoethylamide, basic derivatives of polyglycide, basic cellulose derivatives, for instance diethylaminoethyl cellulose or an ester or ether thereof, provided such resin or other compound is soluble in the solution or a constituent of the solution used for forming the shaped structure or is at least capable of sufficiently homogenous dispersion therein. Products of this kind are described in U. S. patent application Ser. No. 47,638 filed October 31, 1935 and U. S. patent application Ser. No. 64,776 filed February 19, 1936.

It is not necessary that the basic or acid residues should be obtained from the first in a free form in the structure. Alternatively, they may be, and indeed in many cases with particular advantage, formed or liberated only subsequently, for example by an after-treatment with a hydrolizing, alkylating or aminating agent in the case of basic groups and by treatment with hydrolizing or oxidizing agents in the case of acid groups. In this connection reference is also made to the above named applications. However, the present process is not limited to the fibers and foils with additional components named as examples therein.

The substrata suitable for the present invention also contain both acid and basic salt-forming groups. The combination of acid and basic groups in the structure increases considerably the reactivity and leads to particularly intense and manifold effects, since the primary component may be made to combine with acid or basic groups at choice. If desired both functions can be utilized simultaneously, whereupon the reaction may be produced within the structure by varying the pH-value by heating, by steaming or by the action of an oxidizing agent. In practice very varied color effects are obtainable, for example in yarn or fabric composed on the one hand of fibers which possess acid or simultaneously acid and basic groups and on the other hand of fibers which contain only acid or only basic groups. By including further components without additions of a polar kind three—and if desired more color effects may be obtained; the latter, when one or other constituent of the fabric is worked up in a condition dyed during spinning, previously dyed or pre-treated with a component which is reactive.

Reactions which fall within the ambit of the invention are, for example, as follows:

1. The reaction of a heavy metal combined with an acid group in the structure, for instance mercury, silver, lead, copper, cadmium, iron, cobalt, nickel or uranium with dissolved or gaseous sulfuretted hydrogen, a soluble sulfide, for instance ammonium sulfide, sodium hydrosulfide, magnesium hydrosulfide or with a material which easily yields sulfur, for instance thiourea or hyposulfite.

2. The reaction of a heavy metal combined in the fiber with a ferrocyanide or a ferricyanide, for instance the reaction of zinc or copper or trivalent iron with potassium ferrocyanide or the reaction of divalent iron with potassium ferricyanide.

3. The reaction of chromic acid united with a basic group with a lead salt or a barium salt and vice versa the reaction of lead or barium with chromic acid.

4. The reaction of a heavy metal united by an acid group to the fiber with an organic substance, capable of forming a color complex, which is not itself a dyestuff, for example a $\beta$-dicarbonyl compound, a hydroximino-ketone, an $\alpha$-dioxime, an amido-oxime, a hydroxyamido-oxime, a polyhydric phenol, a hydroxy-quinoline, a nitrosoarylhydroxylamine, a thioglycolic acid arylide. As individuals there may be named anisoylbenzoylmethane, hydroxymethylene camphor, the diimine from ethylene-diamine and 2 mol acetylacetone, isonitrosoacetoacetic acid anisidide, the isonitroso-compound of acetone-oxalic acid ester anil, 1-nitroso-2-naphthole, 2-nitroso-1-naphthole, isonitrosoacetophenone, salicyl aldehyde oxime, dimethyl-glyoxime, $\alpha$-benzyldioxime, benzamidoxime, oxalene-diamido-oxime, paranitrobenzhydroxamic acid, phenyl-glyoxalbenzoin, pyrocatechol, 8-hydroxyquinoline, tannin and other tan-stuffs, nitrosophenylhydroxylamine, metadimethylaminonitrosophenyl-hydroxylamine, $\alpha$-piccolinic acid, quinaldic acid, quinoxaline-dicarboxylic acid, dicyandiamidine.

The absorption by the film or fiber of the components of the reaction may, when the molecular weight of the said components requires it or when a particularly deeply seated effect is desired, be assisted by a swelling agent, such as acetone, alcohol, acetic acid, phenol, a sulfocyanide, thiourea or pyridine; also weakly basic substances, which otherwise have no particular swelling properties, like urea, have a good effect, especially in the case of structures having carboxyl groups. The swelling agent must be selected so that no insoluble precipitate may be formed with the components that are to react and that further the materials added in the structures are not dissolved and washed off. In some cases dissolution may be prevented by the addition of a substance which prevents or diminishes solubility. Such substances are, in the case of acid groups, for instance calcium salts or zinc salts, also amines or ammonium salts of high molecular weight. In the case of basic components, such as alkylnaphthalene sulfonic acids, sulfosalicyclic acid, trichloracetic acid and their salts come into consideration. These substances, however, must not be present in too high a proportion in so far as they are not very easily exchangeable for the reacting components.

Finally, the absorptive capacity of the structure, so far as it contains groups capable of elimination by hydrolysis, may be enhanced by a saponifying agent, for example an alkali, a salt of alkaline reaction, ammonia or an amine. Preferably saponification should not proceed to the material of the substratum, but should substantially be limited to the salt-forming component.

The order in which the double decompositions of the components are to be brought about is fundamentally indifferent. It is necessary in each case to ascertain by suitable experiment what is the best procedure. And so also the working conditions, such as the pH-value of the liquor, the temperature, the kind and proportion of the added substances, for example, the addition of salt must be adapted for each reaction. Further it is necessary that in reactions which produce the conversion of a dissolved substance to an insoluble coloring or matting precipitate, to add a dispersing agent, such as oleylpolyglycol, quaternary capillary active ammonium compounds and if desired also a protective colloid whereby an improvement of the fastness to rubbing is obtained and the dirtying of uncolored components in mixed fabrics may be avoided as far as possible.

The operation of introducing a component by a dyeing operation or otherwise may with advantage follow directly on the production of the shaped structure. For example, acetate silk which contains the aforesaid maleic anhydride mixed polymerizate in a proportion of 5 to 15 per cent may be treated in the spinning machine or in the precipitating bath with a metal salt such as copper acetate, cobalt acetate, nickel acetate or iron nitrate. It is also practicable to treat in a later operation, for example in spinning the material in the form of a wound bobbin, cross-spinning or the like, with a solution of the salt in question, it being advantageous to add also urea or another agent that activates the carboxyl group. In making staple fiber the mordant may be applied during the spinning or immediately afterwards or in combination with a wet aftertreatment, for instance for the purpose of crimping. The process has the advantage over dyeing during spinning that a whole number of fast tints in any depth may be obtained with one and the same spinning solution in a simple manner.

There exists also the possibility of adding one or another component to a preparatory solution, in which case different developments give rise to numerous possibilites of variation. Finally the structure may contain from the spinning onwards white or colored pigments, for example, 1 per cent of titanium dioxide or 0.2-1 per cent of carbon black. A comparatively small addition of black is advantageous, particularly in cotton material which is intended for admixture with wool for the cloth industry, in which case full color tints are deemed desirable, this being attainable by the after-treatment according to the invention of the fiber which has been colored black during the spinning.

Very deep tints are obtained in many cases by a single treatment. Where this is not the case, the treatment may be repeated once or several times until the absorptive capacity of the fiber is exhausted. Mixed tints are obtained by simultaneous use of several grounding or development processes or by successive independent coloring operations. Finally any combination with other known dyeing or coloring methods comes within the limits of the invention.

The process is not only applicable to dyeing, but also with advantage to printing. Thus a fabric of acetate silk to which has been added a maleic anhydride mixed polymerizate may be impregnated with a metal salt, for instance a copper or a nickel salt and after rinsing and drying may be printed with different complex-forming substances, for instance 1-nitroso-2-naphthol, dimethyl-glyoxime, hydroxymethylene camphor or 4-nitrobenzhydroxamic acid. On the other hand bottom dyeings may be produced on the goods and these over-printed with any organic dyestuff suitable for the material, accompanied in suitable cases with white discharge or color discharge effect. Thus a cellulose acetate fabric having acid groups may be pretreated with copper acetate and then dyed green with dimethylglyoxime and then discharged by means of a paste containing a strong acid such as oxalic acid. In this case it is advantageous to add diethyltartrate as a swelling agent. It is also advisable to add to the paste a substance which combines in a complex manner the cation liberated by the discharge and thus to prevent its being again taken up by the fiber during rinsing. The paste may also contain a compound which destroys by oxidation or by reduction or makes ineffective by condensation the organic liberated complex former. This may be achieved by means of potassium chlorate or aluminium chlorate or hydrosulfite or a carbonyl reagent, such as benzhydrazide, semi-carbazide or hydrazine sulfonic acid. As an oxidizing agent an alkyl halide derivative or sulfonamide may be used. For example, a fabric of acetate silk having an acid component which, after a grounding with a copper salt was developed with potassium ferrocyanide to a red-brown tint, is discharged by means of a paste which contains ethanolamine or the like. To this paste may also be added a dispersion dyestuff or acetate silk so that a color discharge is possible. The same effect is obtainable by printing a compound which reacts with the metal component of a previously applied complex compound with decomposition of the complex and conversion of the complex metal into another colored compound, for example by using a discharge agent which converts the metal into the sulfide, for instance a hydrosulfite.

In general the dyeings produced by the process of the invention are thoroughly fast to washing; in many cases, however, an improvement follows if the dyed filaments are after-treated with a water-repelling agent that diminishes the swelling.

In the case of structures having acid groups such an after-treatment may consist in saturating the still free carboxyl groups as far as is possible with cations, preferably colorless, which have a tendency to form sparingly soluble compounds, for example magnesium, calcium, barium, aluminium, zinc, cadmium, also organic bases, especially quaternary ammonium bases and the analogous phosphonium or sulfonium compounds; also guanidine or biguanide may be mentioned. Of these substances those are especially effective which have a long aliphatic chain with, for example, 8-14 carbon atoms, or a residue of an aliphatic aromatic compound or hydrocyclic compound of high molecular weight.

Particularly suitable are mixtures of components having different lengths of chain, since in this manner an especially good depth of action and at the same time a very favorable effect on the feel of the material, owing to the accumulation of the constituents of highest molecular weight on the surface. The after-treatment with amines or their salts is particularly useful when the deposited metal compound, for instance of colored metal sulfide, has a certain tendency for autoxidation, especially in presence of moisture. The protective effect of the amines extends both to the diminution of the hygroscopic tendency and the anti-oxidizing effect. In many cases it has been found advantageous to provide a treatment in which instead of the simple amine or in addition to the amine there is used a particularly strongly acting anti-oxidizing agent, especially one which has a tendency to combine with traces of liberated metal ions, for example an arylmercaptan, a mercaptoalkylamine, mercaptobenzothiazole, an alkyl- or aryl thio-semi-carbazide, thiourea, a polyhydric phenol or an oxime.

In the case of structures having a basic character an anionic agent is suitable for diminishing the capacity for swelling, for instance a perchlorate, a trichloracetate, a fatty alcohol sulfonate, a sulfonic acid of high molecular weight of the aliphatic or aromatic series.

The invention is not limited to structures consisting of one or more components, although in general the best results are obtained with such materials. The reactive salt-forming groups may also be produced by an after-treatment with an oxidizing agent or a basic aminating agent in an individual material during or after the shaping operation. Reactions of this kind, for example, the reaction of ethylene imine vapor on acetate silk or the reaction of acetyl cellulose in dioxane solution with diethylamine epihydrin directly before the spinning, also the oxidation of threads from hydroxyethylated acetate silk by means of strong oxidizing agents, such as potassium permanganate.

The following examples illustrate the invention:

1. An acetate silk satin fabric, the warp of which consists of stripes of ordinary acetate silk alternating with stripes of acetate silk having 10 per cent of a mixed polymerizate from 1 mol vinylmethyl ether and 1 mol maleic anhydride is treated after having been desized with soap solution and without an intermediate acid treatment in a liquor ratio of 1:40 with an aqueous solution of 10 per cent strength of copper acetate for ½ hour at 60° C. The strips of the silk which contain resin now have a relatively powerful blue-grey color. After a short rinsing the fabric is immersed in a solution of ammonium sulfide of 1 per cent strength at room temperature, whereby the color is gradually developed through brown to greenish black. The portions consisting of ordinary acetate silk are reserved white. The black effect obtained is fast to rubbing and washing.

The development may be interrupted if desired when the brown tint has been produced. However, it is then necessary to remove completely any unattacked copper or to convert the latter into a non-dissociated compound so that autoxidation may be avoided. It is therefore in this case more advantageous to use in the pre-treatment a weaker solution of copper salt or in working with a standing bath of correspondingly higher concentration to shorten the duration of the treatment.

When particularly strong coloring is desired the treatment may be repeated.

2. The goods grounded with copper acetate in the manner described in Example 1 are developed at 50° C. with 2 per cent of dimethylglyoxime. There is obtained an apple green color.

3. The goods are grounded as described in Example 1 with a solution of potassium forrocyanide. There is obtained a brown-red color.

4. The goods grounded as described in Example 1 are developed with anthranilic acid. There is obtained a green pastel tone.

5. The goods grounded as described in Example 1 are developed with salicylic acid. There is produced a clear blue green.

6. The goods grounded as described in Example 1 are developed with cupferron (nitrosophenyl-hydroxylamine). There is obtained a stone in green pastel tone.

7. The goods grounded as described in Example 1 are developed with 4-nitrobenzhydroxamic acid. A grass-green color is produced.

8. The fabric used in Example 1 is treated for 1¾ hours at 75° C. with 20 per cent of ferrous ammonium sulfate in presence of 0.5 gram of oleyl-polyglycol and then developed at 60° C. with 2 per cent of nitrosonaphthol. There is produced a fast olive green color (pigment green).

9. The goods grounded as described in the preceding example are developed in a solution of potassium ferricyanide whereby a very pure brilliant greenish blue is produced (Turnbull's blue). The white is only very little tinted. If the process is reversed by first mordanting with ferric nitrate and developing with potassium ferrocyanide there is obtained a dull blue-green.

10. Acetate silk containing 12.5 per cent of the mixed polymerizate from vinylethyl ether and maleic anhydride is grounded with 10 per cent of ferric chloride at 50° C. and developed with 4-nitrobenzhydroxamic acid. There is obtained a rust brown color.

11. A fabric of acetate silk containing 12.5 per cent of the mixed polymerizate from vinyl ethyl ether and maleic anhydride an colored as described in Example 8 is after-treated with 5 per cent of copper acetate for a short time. By subsequently developed with cold ammonium sulfide there is obtained a field grey tint.

12. A fabric of acetate silk, the warp of which consists of alternating strips of acetate silk containing 10 per cent of the mixed polymerizate from vinylmethyl ether and maleic anhydride, ordinary acetate silk and acetate silk having 10 per cent of polyvinylchloracetate is desized and pretreated as described in Example 1 with 20 per cent of cadmium acetate. By immersing the fabric in dilute ammonium sulfide solution there is obtained an intense rather brilliant yellow, fast to light rubbing and washing on those strips which contain a maleic anhydride polymerizate. The two other components remain uncolored. If now the fabric is treated by the process of U. S. patent application Ser. No. 41,500 filed September 20, 1935 with three times the quantity of pyridine vapor, calculated as equivalent to the halogen present, and then dyed with 2 per cent of Indigosol Green IB (Schultz Farbstofftabellen, 7th Ed., vol. 2, page 133) by the nitrite process there is obtained a yellow-white-green stripe effect which is fully stable to light. Cadmium yellow, as is shown by a cross-section of the filaments, is thoroughly distributed in the latter.

13. An acetate silk having 7.5 per cent of polyvinylchloracetate and 7.5 per cent of the mixed polymerizate from 1 mol of maleic anhydride and 1 mol of vinylformate is soaped at 80° C. and aminated in toluene with three times the quantity of pyridine, calculated as equivalent to the halogen. The fabric is then mordanted with 20 per cent of ferrous ammonium sulfate at 40–75° C. and finally dyed simultaneously with 2 per cent of Sirius Light Yellow (Schultz Farbstofftabellen, 7th ed., suppl. vol., page 131) and 3 per cent of isonitroso-β-naphthol at a temperature between 40 and 80° C. There is obtained a yellow-green dyeing of good properties of fastness.

14. A mixed fabric containing in addition to ordinary acetate silk an acetate silk having 12.5 per cent of the mixed polymerizate from vinyl formate and maleic anhydride is primarily dyed with 3 per cent of Celliton Fast Yellow (Schultz Farbstofftabellen, 7th ed., vol. 2, page 5) in the usual manner; it is then mordanted with copper acetate and developed with ammonium sulfide. There is produced a very good two-color effect in yellow and black.

15. An acetate silk mixed fabric similar to that used in Example 1 is dyed in the usual manner with 1 per cent of Cellitazol R (Schultz Farbstofftabellen, 7th ed., vol. 2, page 44) and after withdrawal of the base there are added copper acetate and so much sodium acetate that the solution remains still clear. After a further treatment for ½ hour at 60° C. the black is first developed with ammonium sulfide and the goods are then diazotized in the usual manner and finally developed with 1.5 per cent of Developer J. It is preferable to give the final short treatment with ammonium sulfide. There are obtained black stripes on a reddish-yellow ground. The dyeing is very fast to washing.

16. Acetate cellulose which contains 12.5 per cent of the mixed polymerizate from maleic anhydride and vinyl formate is pre-treated in the course of ½ hour with 10 per cent of cobalt acetate. The color is developed with ammonium sulfide. The deep black material is now finished with 2 per cent of a mixture of dodecylamine acetate and 1 per cent of octadecyltrimethylammonium chloride and can be used in admixture with white wool.

17. Acetate silk which contains 10 per cent of the mixed polymerizate of vinylmethyl ether and maleic anhydride is treated with 5 per cent of tetra-γ-chloro-β-hydroxypropyl ammonium acetate and then with 15 per cent of ethylene imine in the form of vapor, the latter treatment being for 5 hours at 80° C. The ethylene imine disappears. By after-treatment with copper acetate solution the previously wetted silk takes up copper freely. The goods developed with ammonium sulfide may then be printed with dyestuffs containing acid groups, top-dyed or brightened. In this manner deep tints may be produced with fast acid dyestuffs which are comparatively feeble dyes and would not otherwise produce such deep tints.

18. A satin fabric of acetate silk which contains 10 per cent of the mixed polymerizate from vinylmethyl ether and maleic anhydride is mordanted with 10 per cent of cobalt acetate at 60° C. The metal is freely taken up. By developing with diphenylthiocarbazone there is obtained an intensely brownish-violet tint.

19. A satin fabric, the warp of which consists of alternating stripes of an acetate silk mordanted with cobalt acetate and containing 10 per cent of the mixed polymerizate from 1 mol vinylmethyl ether and 1 mol maleic anhydride, of ordinary acetate silk and of acetate silk containing 12.5 per cent of the aforesaid polymerizate but without having been mordanted with a metal salt, is first desized in a soap bath and then immersed in ammonium sulfide solution of 1 per cent strength, whereby the first named stripes are colored deep black with cobalt sulfide. The goods are now mordanted with nickel acetate and finally developed with 2 per cent of dimethylglyoxime in presence of sodium acetate, whereby the third named stripes are dyed scarlet red. The goods are finally brightened with a mixture of quarternary ammonium compounds on the alkylbromide mixture from palm nut fatty alcohol and trimethylamine.

20. An acetate silk containing 10 per cent of the mixed polymerizate from acrylic acid and vinyl acetate is treated with chromium acetate solution at 40 to 60° C., there being preferably added ammonium sulfocyanide. The pre-mordanted fiber is dyed deep brown with 4 per cent of dinitroresorcinol.

21. A satin fabric of acetate silk containing 10 per cent of the mixed polymerizate from vinylmethyl ether and maleic anhydride (1:1) is grounded with 1 per cent of silver acetate, preferably in presence of a desensitizer, at 60° C. By treatment with sodium phosphate the mordanted fabric becomes first yellowish in the cold, on warming the color turn towards a violetish brown. With hydrogen sulfide there is obtained a brown tone. By exposure to light alone there is produced a brownish silver tone which, by treatment with sodium selenosulfate becomes reddish. By exposing through a negative half-tone images are obtained. In this case the sensitiveness is advantageously enhanced by addition of a sensitizer.

22. A patterned mixed fabric which consists in part of ordinary acetate silk and in part of acetate silk having an addition of 10 per cent of the mixed polymerizate from vinylformate and maleic anhydride (1:1) is pre-mordanted with 10 per cent of zinc acetate for 1 hour at 60° C. By developing with potassium ferrocyanide there is obtained a beautiful matt effect which may be top-dyed with basic dyestuffs in the cold without loss of luster.

23. The same acetate silk as is used in the preceding example is grounded with 10 per cent of barium acetate. By immersing the silk in dilute sodium bisulfite solution there is obtained a very strong matt effect. The barium sulfite thus formed is oxidized by the air to barium sulfate. The matt effect is also obtained by after-treatment with dilute sulfuric acid; this effect, however, is less strongly pronounced.

24. The same silk as is used in the preceding example is grounded with barium acetate and immersed in a dilute solution of sodium bichromate. There is obtained a yellow pastel shade.

25. The same acetate silk as is used in the preceding example is grounded with 10 per cent of lead acetate for 1 hour at 60° C. By developing with potassium bichromate there is obtained a luminous yellow color.

26. The fabric grounded as described in the preceding example with lead acetate is developed with potassium iodide solution. There is produced a reddish gold-yellow.

27. An acetate silk containing 6 per cent of polyvinylchloracetate and 6 per cent of the mixed polymerizate from vinylmethyl ether and maleic anhydride (1:1) is treated in a liquor ratio of 1:40 in an aqueous solution of 20 per cent of barium sulfocyanide and 8 per cent of N-cyclohexyl-N'-dimethylthiourea dispersed with oleyl polyglycol, the treatment being for 2 hours at 70 to 85° C. In this manner the fiber is aminated with formation of an isothiourea ether group. Simultaneously the barium and sulfocyanogen ions are bound. By after-treatment with weak acidified sodium hydrochloride solution barium sulfate is formed in the fiber. If, simultaneously, the fabric is dyed with a basic dyestuff stable to oxidation there is obtained a matt dyeing.

28. The same fabric as is used in the preceding example is aminated with pyridine and treated with barium methylsulfate. By raising the temperature to 85 to 90° C. barium sulfate is formed by hydrolysis within the fiber.

29. The same acetate silk as is used in the preceding example is aminated with pyridine and then dyed with 2 per cent of Indigosol Green IB (Schultz Farbstofftabellen, 7th Ed., vol. 2, page 133) and the dyeing is developed in the usual manner by means of chromic acid. By after-treatment of the dyed silk with lead acetate chrome yellow is produced on the fiber. The tint is yellow-green. The chromate may be dyed on the fiber under neutral conditions simultaneously with the Indigosol and the dyeing developed by a treatment with acid.

30. The warp of an acetate silk fabric which contains 12.5 per cent of the mixed polymerizate from vinylmethyl ether and maleic anhydride (1:1) is impregnated on the sizing machine with a size containing per liter 120 grams of gelatin, 60 grams of urea, 10 grams of oleic acid diethanolamide and an ammoniacal solution of 20 grams of copper. After working up the goods are desized in a soap bath and brought into a liquor containing 10 per cent of ammonium sulfide, calculated on the goods. The warp is dyed greenish black.

31. Acetate silk which contains 7.5 per cent of polyvinlychloracetate and 5 per cent of the mixed polymerizate from maleic anhydride and vinylformate (1:1) is first treated with pyridine at 40 to 50° C. and then with a barium sulfocyanide solution of 2.5 per cent strength, containing 5 per cent of urea. The goods are finally oxidized with hydrogen peroxide solution, whereby barium sulfate is produced within the fiber.

32. Acetate silk which contains 12.5 per cent of the mixed polymerizate from vinylmethyl ether and maleic anhydride (1:1) is first thoroughly soaped and then treated with 20 per cent of zinc acetate for 1 hour at 60° C. for the purpose of activating the carboxyl groups. After treatment with sodium hyposulfite zinc sulfide is formed in the fiber. The material obtains a matt appearance. If a mixture of zinc acetate and cadmium acetate is used there is obtained by treatment with hyposulfite a yellow pastel tone.

33. A satin fabric in which the warp consists of alternating stripes of ordinary acetate silk and acetate silk with an addition of 10 per cent of the mixed polymerizate from vinylmethyl ether and maleic anhydride (1:1) is treated with 10 per cent of manganese acetate for 1 hour at 65 to 70° C. After rinsing the color is developed by means of potassium permanganate. There is obtained a lustrous deep brown effect on a slightly dyed ground.

34. An acetate silk containing polyvinylchloracetate, aminated with 10 per cent of pyridine on the fiber is thoroughly rinsed and then treated with sodium sulfate and 3 per cent of potassium permanganate at room temperature. The fabric is uniformly colored brown. After soaping the color is brilliant and fast to rubbing. It can be discharged white by means of oxalic acid.

35. An acetate silk which has been treated for 8 hours at 70° C. and 92 per cent of relative atmospheric moisture with 15 per cent of ethylene imine vapor is grounded with 2 per cent of potassium bichromate for 1 hour at 40 to 50° C. whereupon the dyeing is developed with 10 per cent of lead acetate.

36. An acetate silk containing 7.5 per cent of polyvinylchloracetate and 5 per cent of the mixed polymerizate from vinylmethyl ether and maleic anhydride is caused to react with an excess of pyridine in the gaseous phase and pre-mordanted with 3 per cent of potassium bichromate at 40 to 60° C. The silk is again rinsed and then immersed in a liquor containing 10 per cent of lead acetate, calculated on the weight of the goods, and 200 grams of acetone per liter. The original lustrous silk is in this manner colored an intense matt yellow by formation of chrome yellow in the fiber. After thorough soaping the goods are finally finished with octadecyltrimethylammoniumacetate. Instead of acetone alcohol or dioxane may be added to the lead acetate solution. The coloring is completely fast to washing and of good fastness to rubbing. In spite of the content of pigment the silk is soft to feel and remains smooth.

37. The same silk as is used in the preceding example is first soaped in the form of compact bobbins in a dyeing apparatus for 2 hours at 65° C. with 5 grams of soap per liter and then, after rinsing, treated in the same apparatus with a 10 per cent solution of lead acetate at 60° C. The fiber takes up much lead, as can be followed by observing the blackening produced by ammonium sulfide solution. The fiber thus mordanted with lead is now suspended over pyridine and after-treated with ammonium bichromate at 30 to 60° C. The very uniform coloring is this time lustrous owing to the soaping. The treatment with pyridine may also precede the treatment with lead acetate. In this case there is no soaping, but there should be added to the lead acetate solution 10 per cent of urea, calculated on the weight of the silk.

38. An acetate silk, which in addition to 80 parts of acetone soluble acetyl cellulose having 52 per cent of combined acetic acid contains 20 parts of acetone soluble acetyl cellulose monophthalic acid, obtained by reaction of an acetyl cellulose having 50.8 per cent of combined acetic acid and phthalic anhydride, is mordanted for 1 hour at 75° C. with 20 per cent of copper acetate in presence of 1 gram of sodium oleylmethyl-taurine. By after-treatment with 3 per cent of salicyl aldehyde oxime there is obtained a green dyeing.

39. A film of cellulose ethyl ether having 41 per cent of ethoxyl and containig 8 per cent of polyacrylic acid-omega-diethylaminoethylamide is treated with 3 per cent of potassium bichromate for 1 hour at 30 to 50° C. The dyeing is developed with an aqueous solution containing per liter 200 grams of alcohol and 25 grams of lead acetate. The color is developed at 30 to 40° C. When the color no longer increases the goods are washed and soaped.

40. A solution consisting of 20 parts of acetyl cellulose having 54 per cent of combined acetic acid, 2 parts of the mixed polymerizate from vinylformate and maleic anhydride (1:1), 0.05 part of $\alpha$-nitroso-$\beta$-naphthole and 75.5 parts of acetone is spun to acetate cellulose threads. After cutting to staple length the material is treated in the presence of 20 per cent of urea with a metal salt such as basic ferrous acetate, cadmium acetate, manganse acetate, nickel acetate, cobalt acetate or a mixture of any of these. There are obtained fast tints.

By further action of subtsances which react with metals to form insoluble compounds, for instance sodium hyposulfite, potassium ferrocyanide, para-nitrophenyl-hydroxamic acid or dimethylglyoxime the tints may be varied so far as the fiber still contains metal which is not in complex union.

41. A film made from polyvinyl alcohol, partially acetalized with formaldehyde and containing 12 per cent of the mixed polymerizate from vinyl chloride and maleic anhydride (1:1), is first immersed for 2 hours in a 0.5 per cent aqueous solution of triethanolamine at 30° C. and is then treated with copper acetate solution of 5 per cent strength for 2 hours at 40 to 50° C. By after-treatment with an alkaline solution of acetone oxalic ester imine there is obtained a beautiful green color.

42. Acetate silk containing 10 per cent of the mixed polymerizate from vinylmethyl ether and maleic anhydride is printed at intervals on the running thread with a paste thickened with tragacanth and containing tetrammine cadmium hydroxide and tetrammine cupric hydroxide and urea. By after-treating the fabric made from this yarn with ammonium sulfide solution there is obtained a black-white-yellow ombré effect.

A similar process can also be applied in printing yarn or warp, for which the process of the invention is essentially better suited owing to the free penetration of the agents than the dyeing method with dispersion dyestuffs insoluble in water which, as a rule, require prolonged steaming. Since in the developing of the dyeings in the present process comparatively low temperatures are sufficient, pure effects of this kind are easily obtained, also with the wax reserve method.

43. To a solution of dimethyl cellulose in a mixture of methylene chloride and methanol (85:15) there is added 8 per cent of the mixed polymerizate from vinylmethyl ether and maleic anhydride (1:1), calculated on the quantity of the cellulose ether. The film obtained from this solution after pre-treatment with 0.5 per cent of triethanolamine solution at 30° C. is mixed in a 5 per cent nickel acetate solution for 2 hours at 60-65° C. By after-treatment with dimethylglyoxime in the presence of sodium acetate there is obtained a red dyeing.

44. A fabric of acetate silk containing 10 per cent of the mixed polymerizate from vinylmethyl ether and maleic anhydride (1:1) is printed with a paste consisting essentially of an acid tartaric acid solution of polyethylene imine or an oxyethyl derivative thereof. The copper is bound in complex union on the parts printed with the discharge paste, so that the printed parts remain practically uncolored on development with ammonium sulfide. For the binding of copper in complex union there are specially suitable amines which are substituted by several omega-carboxymethyl-radicals, such as for instance tris-[omega-carboxy-methyl-] amine.

45. An acetate silk containing originally 7.5 per cent of polyvinylchloracetate and 7.5 per cent of the mixed polymerizate from vinylmethyl ether and maleic anhydride (1:1) aminated with pyridine is first pretreated in presence of urea with 5 per cent of titanium potassium oxalate and then after-treated with a 5 per cent solution of basic ferrous acetate. There is obtained simultaneously a pigmentation with titanic acid and a color which may be well washed, by the adsorption of iron. The goods are finished with 2 per cent of dodecylguanidine.

The process may, as stated elsewhere herein, and as indicated in the examples, be combined with many known methods of dyeing. In the case of already dyed material there is the advantage that the top-dyeing with the agents of this invention is possible in most cases without prejudice to the first dyeing. This condition is particularly important in the case of acetate silk, since the typical acetate silk dyestuffs are, as a rule, only moderately top-dyed. Finally, it may be remarked that already existing dyeings may be improved in their properties of fastness by a top-dyeing by the process of the invention which, doubtless, is to be attributed to the fact that insoluble substances introduced hinder diffusion on the fiber.

What I claim is:

1. A process of producing colorings on artificial textile materials and foils, said textile materials and foils comprising one of the group of organophilic colloids consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin with a salt-forming group, which process comprises forming a precipitate of an insoluble metal compound on said textile materials and foils.

2. A process of producing colorings on the untreated artificial textile materials and foils of claim 1, which process comprises forming an insoluble precipitate of a colored metal compound of an organic substance which has not per se the character of a dye.

3. A process of producing colorings on artificial textile materials and foils, said textile materials and foils comprising one of the group of organophilic colloids consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin having in its molecule both acid and basic groups, which process comprises forming a precipitate of an insoluble metal compound on said textile materials and foils.

4. A process of producing colorings on artificial textile materials and foils, said textile materials and foils comprising one of the group of organophilic colloids consisting of—cellulose ethers, cellulose esters, cellulose ether esters, polymeric vinyl esters, after-chlorinated polymeric vinyl esters, polymeric vinyl ketones and mixtures of these substances—and having incorporated and fixed therein an artificial resin with a salt-forming group, which process comprises forming a precipitate of an insoluble metal compound on said textile materials and foils in the presence of a swelling agent.

5. A process of producing colorings on artificial textile materials and foils, said textile materials and foils comprising one of the group of organophilic colloids, consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin with a salt-forming group, which process comprises forming a precipitate of an insoluble metal compound on said textile materials and foils in the presence of a dispersing agent.

6. A process of producing colorings on the untreated artificial textile materials and foils of claim 1, forming an insoluble precipitate of a metal compound and after-treating said materials with a compound capable of forming an insoluble hydrophobe salt with said salt-forming group.

7. A process of producing colorings on artificial textile materials and foils, said textile materials and foils comprising one of the group of organophilic colloids consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin having in its molecule acid groups, which process comprises treating said textile materials and foils with a carbamide and forming thereon an insoluble precipitate of a colored metal compound of an organic substance which has not per se the character of a dye.

8. A process of producing colorings on artificial textile materials and foils comprising one of the group of organophilic colloids consisting of— cellulose esters, cellulose ethers, cellulose ether esters, polymeric vinyl esters, after-chlorinated polymeric vinyl esters, polymeric vinyl ketones and mixtures of these substances—and having incorporated and fixed thereon an artificial resin having in its molecule acid groups, which process comprises forming a precipitate of an insoluble metal compound on said textile materials and foils and after-treating said textile materials and foils with a salt of a metal of the group consisting of magnesium, calcium, barium, aluminium, zinc, cadmium, lead, copper, nickel, cobalt, manganese and silver.

9. A process of producing colorings on the untreated artificial textile materials and foils of claim 8, which process comprises treating said textile materials and foils with an alkaline agent and forming thereon a precipitate of an insoluble metal compound on said textile materials and foils.

10. A process of producing colorings on artificial textile materials and foils comprising one of the group of organophilic colloids consisting of cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin having in its molecule acid groups, which process comprises forming a precipitate of an insoluble metal compound on said textile materials and foils and after-treating said textile materials and foils with an organic base of the group consisting of ammonium-, phosphonium-, sulfonium-bases, guanides and biguanides, said organic base having in its molecule a carbon chain of from 8 to 14 carbon atoms.

11. A process of producing colorings on artificial textile materials and foils, said textile materials and foils comprising one of the group of organophilic colloids consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin having in its molecule basic groups, which process comprises forming on said textile materials and foils a precipitate of an insoluble metal compound and treating said textile materials and foils with an alkali salt of an acid of the group consisting of perchloric acid, trichloracetic acid, sulfonic acid of fatty alcohols, aliphatic and aromatic sulfonic acids having a long carbon chain, sulfidized phenols, tannin, phosphotungstic acid.

12. A process of producing colorings on artificial textile materials and foils, said textile materials and foils comprising one of the group of organophilic colloids consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin with a salt-forming group, which process comprises dyeing said textile materials and foils in a manner in itself known with an organic dyestuff, forming on said textile materials and foils an insoluble precipitate of a colored metal compound of an organic substance, which has not per se the character of a dye.

13. A process of producing colorings on artificial textile materials and foils, said textile materials and foils comprising one of the group of organophilic colloids consisting of—cellulose esters, cellulose ethers, cellulose ether esters, polymeric vinyl esters, after-chlorinated polymeric vinyl esters, polymeric vinyl ketones and mixtures of these substances—and having incorported and fixed therein an artificial resin with a salt-forming group, which process comprises forming on said textile materials and foils an insoluble precipitate of a metal compound of an organic substance which has not per se the character of a dye, and dyeing said textile materials and foils with an organic dye in a manner in itself known.

14. A process of producing colorings on artificial filaments by printing, said filaments comprising one of the group consisting of—cellulose esters, cellulose ethers, cellulose ether esters, polymeric vinyl esters, after-chlorinated polymeric vinyl esters, polymeric vinyl ketones and mixtures of these substances—and having incorporated and fixed therein an artificial resin with a salt-forming group, which process comprises printing said filaments with a printing paste containing a soluble metal compound capable of forming a colored precipitate with an organic compound which has not per se the character of a dye and developing the color by means of an after-treatment with said organic compound.

PAUL SCHLACK.